Feb. 7, 1933. E. ENDERES 1,896,441
WEEDER HOE
Filed June 11, 1932
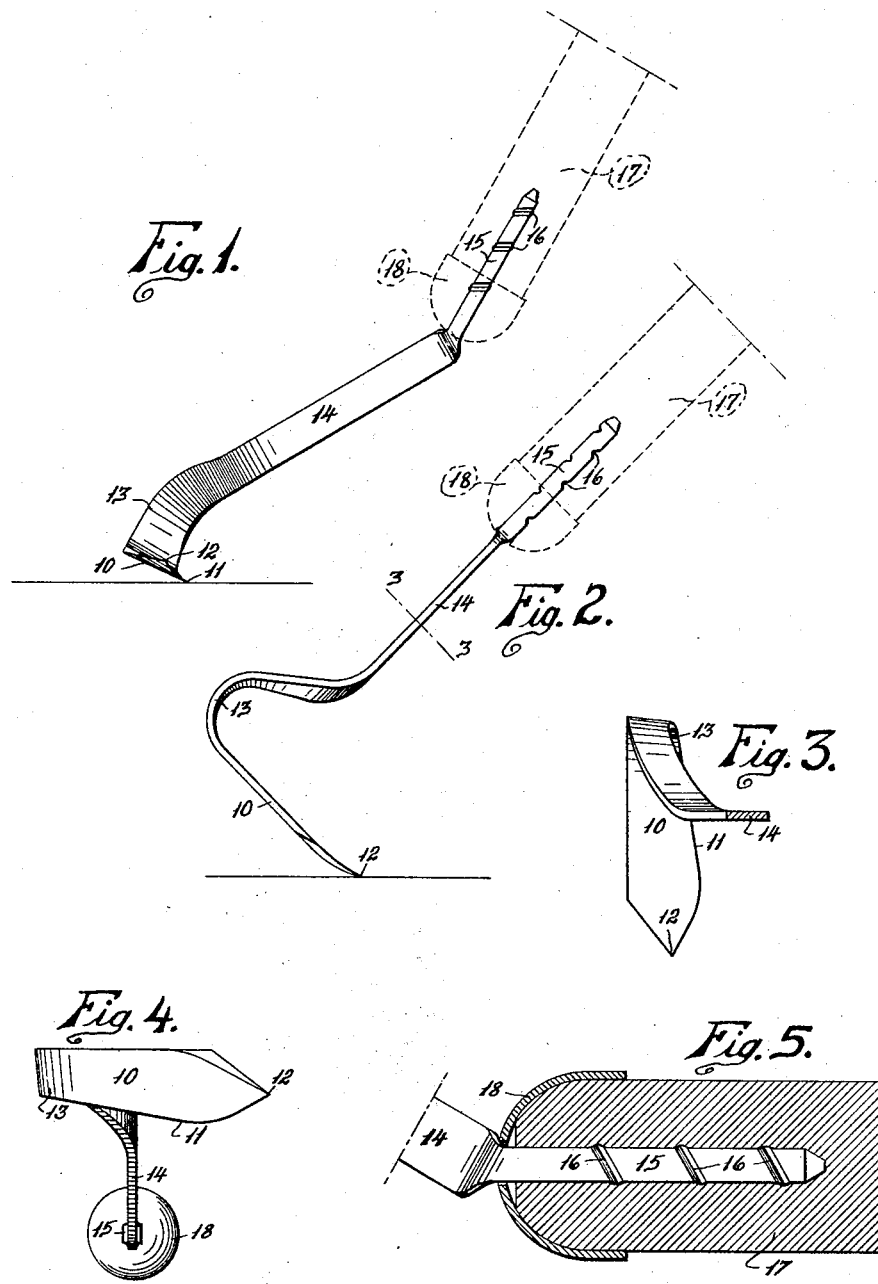
Inventor:
Ernst Enderes.

Patented Feb. 7, 1933

1,896,441

UNITED STATES PATENT OFFICE

ERNST ENDERES, OF GUTTENBERG, IOWA

WEEDER HOE

Application filed June 11, 1932. Serial No. 616,654.

This invention relates to hand-operated garden tools of the type employed in cultivating and weeding, and has as an object the provision of an improved tool of the type described having novel features of construction resulting in enhanced operative efficiency.

A further object of the invention is to provide an improved hoe-type garden tool susceptible of efficient employment in any one of several positions to meet varying conditions of plant growth and spacing.

A further object of the invention is to provide an improved hoe-type garden tool so arranged as to permit close cultivation about small plants without damage to such plants.

A further object of the invention is to provide an improved hoe-type garden tool susceptible of efficient employment between and about closely spaced plants.

A further object of the invention is to provide an improved hoe-type garden tool which is simple and inexpensive of manufacture, unitary in construction, adaptable to a variety of needs and durable and efficient in use.

My invention consists in the construction, arrangement and combination of elements hereinafter set forth, pointed out in my claims and illustrated by the accompanying drawing, in which—

Figure 1 is a side elevation of the improved tool in one of its operative positions, a portion only of the tool handle being indicated in dotted lines. Figure 2 is a view similar to and at right angles with the showing of Figure 1, illustrating another operative position of the tool. Figure 3 is a cross section on the indicated line 3—3 of Figure 2. Figure 4 is an end elevation of the improved tool. Figure 5 is a cross section, on an enlarged scale, of the connection between the improved tool and its handle.

In the construction of the improved tool as shown, the numeral 10 designates the blade or working element of the tool, which blade is relatively long and narrow, substantially flat, thin, sharpened to a cutting edge along the margin 11, and tapered at one end to a sharpened point 12. The long margins of the blade 10 are preferably not parallel, but diverge slightly toward the pointed end so that the greatest width of the blade is found where the taper of the point 12 begins. The metal of the blade 10 is continued from the unpointed end of the blade as a strip which curves away from the blade and is brought back across and in spaced relation with a portion of said blade to form a U-shaped bend 13 including substantially one-half of the blade 10 as one of its sides. The side of the bend 13 spaced from the blade 10 is extended approximately one-half of the length of said blade and is then curved away from said blade and continued as a shank 14 positioned at right angles with the length of said blade, as is clearly shown in Figure 2. The shank 14 is not perpendicular to the plane of the blade 10, but is bent by twisting of the bend 13 out of the perpendicular and toward the edge 11 of said blade to form an acute angle with the plane of said blade, as is clearly shown in Figure 1. The free end of the shank 14 is narrowed in one direction and thickened in another direction to form a stem 15, substantially square in cross section, which stem is tapered somewhat at its free end, serrated or deformed along two of its opposed faces, as indicated at 16, and bent relative to the shank 14 into perpendicular relation with the plane of the blade 10. The tool formed as above described is provided with a suitable handle 17 and is attached to said handle by forcing the stem 15 into an axial bore in one end of said handle, a ferrule 18 being mounted on the bored end of said handle to prevent splitting thereof, as is common practice, and the deformed portions of the stem serving to grip or bite into the material of said handle to provide a firm connection therebetween.

With the construction and arrangement of elements hereabove described, the blade 10 is positioned with its plane perpendicular to the handle 17, the length of said blade extending across the projection of the handle axis and lying in offset relation with such projection, as is clearly shown in Figures 1 and 4, which offset arrangement keeps the working edge of the blade always in clear view of the tool user and permits use of said blade under and about growing plants without damage to such plants which might otherwise result were the handle and blade directly alined. When the tool is used in the position shown in Figure 1, the bend 13 acts as a guard and permits cultivation very close to small and tender plants without danger of cutting or breaking the same, since the curve of the guard prevents any cutting edge of the tool from coming in contact with the plants.

In practical use, the improved tool may be used in one or another of its various operative positions as a weeder, cultivator, sub-soiler, trencher and digger, and is also an efficient dandelion remover in the position shown in Figure 2. To prevent hooking of the tool in use and to aid in its ground penetration in certain operations, the point 12 is preferably curved slightly in the direction of the handle.

Since many changes and modifications in the specific form, construction and arrangement of the elements shown and described may be had without departing from the spirit of the invention, I wish to be understood as being limited solely by the scope of the appended claims, rather than by the details of the illustrative showing and foregoing description.

I claim as my invention—

1. A garden tool comprising, in integral interrelation, a relatively long, narrow blade portion tapered to a point at one end and provided with a cutting edge along one of its long margins, a shank portion perpendicular to the length of and inclined relative to the plane of said blade, a U-shaped portion connecting the unpointed end of said blade with said shank, a stem on said shank laterally offset from said blade and substantially perpendicular to the plane thereof, and a handle secured to said stem.

2. In a garden tool, a relatively long, narrow blade tapered to a point at one end and formed with a cutting edge on one of its long margins, a shank perpendicular to the length of and inclined relative to the plane of said blade, a U-shaped portion integral with and connecting the unpointed end of said blade and said shank, a stem formed on said shank in laterally offset relation with the cutting edge of said blade and substantially perpendicular to the plane of said blade, and a handle secured to said stem.

In witness whereof I affix my signature.

ERNST ENDERES.